Aug. 19, 1952      B. AMES      2,607,619
UTENSIL LIFTER
Filed April 19, 1949
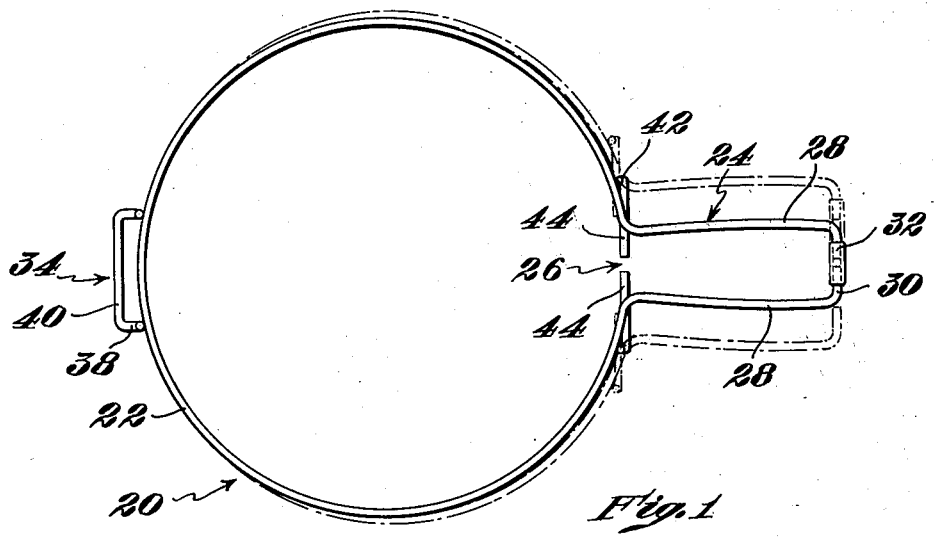
Fig. 1
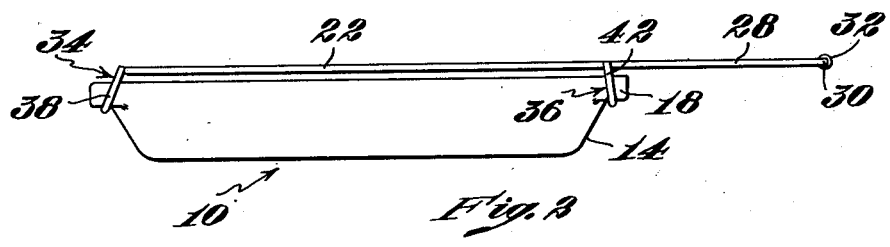
Fig. 2
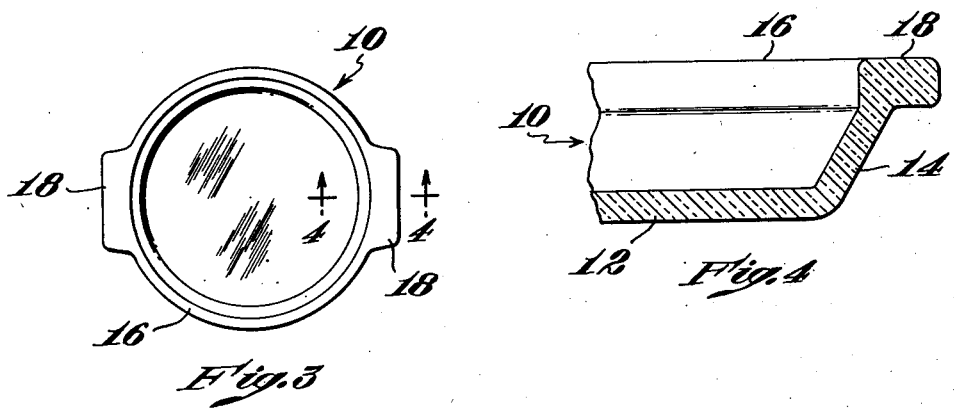
Fig. 3
Fig. 4
Inventor
Butler Ames
by Roberts, Cushman & Grover
Att'ys Patented Aug. 19, 1952

2,607,619

UNITED STATES PATENT OFFICE 2,607,619

UTENSIL LIFTER

Butler Ames, Boston, Mass.

Application April 19, 1949, Serial No. 88,322

2 Claims. (Cl. 294—33)

This invention relates to a lifting device and more especially to a device for lifting, holding and transferring highly heated receptacles such as Pyrex dishes, steak platters and the like from an oven or grill, when the content is suitably cooked, to a place of cooling off.

Objects of the invention are to provide a lifting device which may be readily applied to circular cooking receptacles of the kind having diametrically arranged lifting lips, which need not be gripped or held tightly to support the receptacle, which will hold the receptacle securely without slipping even though it is carelessly manipulated, which will be of durable construction and which will not transmit an undue amount of heat from the receptacle to the handle portion thereof.

As illustrated herein the device includes a loop, specifically shown as a substantially circular annulus of resilient wire and an open handle associated therewith, the loop or annulus having a gap or split therein permitting expansion and carrying bails or supporting devices for engagement with the lips of the receptacle, the bails being substantially diametrically opposite and the distance therebetween being less than the distance between the lips so that when one bail is applied by slipping it under one of the lips of the receptacle the opening of the other bail will not pass under the outer end of the opposite lip. Accordingly, one bail is situated at the gap adjacent to the handle and has separable parts which may be spread apart by distention of the loop when the other bail is engaged with a lip of the receptacle so as to pass down over the lateral edges of the lip to which it is to be applied and to be engaged with the under side thereof by contraction of the loop. The wire is bent at each side of the gap, the bends defining the respective sides of the gap, and extends outwardly from the respective bends to form substantially straight and parallel, spaced handle elements whose outer end portions are bent into alignment and with their tips abutting, thereby holding the parallel handle elements spaced apart to provide an open handle. A sleeve fastened to one of the inturned ends affords a socket for reception of the other inturned end to hold the ends aligned.

The invention will now be described in greater detail with reference to the acompanying drawings in which:

Fig. 1 is a plan view of the holder showing it in its contracted position in full lines and in an expanded position in dotted lines;

Fig. 2 is a side elevation of the device applied to a receptacle of the kind which it is adapted to support;

Fig. 3 is a plan view of a receptacle for which the device is especially made; and Fig. 4 is a vertical section to larger scale on the line 4—4 of Fig. 3 showing the lip portion of the receptacle with which the bails of the device engage when supporting it.

The use of Pyrex dishes, steak platters and other handleless receptacles for cooking is especially desirable because such receptacles take up less room in an oven and because the absence of a handle eliminates in large degree the danger of inadvertently knocking the receptacle from the stove or other place by brushing against it and hence spilling the content thereof with the accompanying danger of serious burns. The absence of handles, however, makes it difficult to transport such receptacle from the oven after the content has been cooked, especially if the receptacle is shallow or nearly filled with hot liquid or if the food be a sizzling steak or chop so that hot grease is flying therefrom. While lifting devices have been supplied heretofore for lifting such receptacles, most of these have been dependent upon a certain amount of gripping action on the part of the person removing the receptacle so that if the receptacle is quite heavy, filled with hot liquid, or is giving off hot spitting grease so that the person removing the receptacle has to hold it gingerly to avoid spilling the liquid or being burned, there is considerable chance that the receptacle may slip out of the grip of the holding device with disastrous results. A receptacle of the kind referred to is shown, for example, at 10 in Figs. 3 and 4 as having a bottom 12, upwardly sloping side walls 14, an out-turned horizontal rim 16 and diametrically opposed lifting lips 18.

The present invention is therefore concerned with the provision of a device which will securely hold a receptacle of the foregoing type without any gripping on the part of the person using the same so that there is no chance of its slipping out of the holder, and of a device which will transfer a minimum of the heat from the receptacle to the handle portion thereof. As illustrated in Fig. 1, the device 20 comprises, essentially a length of wire, bent to form a circular or annulus 22 loop of stiff, resilient wire and a handle portion 24 associated therewith so as to permit manipulation of the loop as will appear hereinafter. A stainless steel wire is preferred since it may be easily cleaned and will retain high luster. The annular loop 22 has a gap 26 at the place where the handle is situated, the handle being constituted by lateral extensions 28—28 bent outwardly from the loop 22 and forming continuous portions thereof spaced apart a distance corresponding to the breadth of the gap 26 and being substantially parallel. The terminal ends of the parallel handle portions 28—28 are bent inwardly at 30—30 and to one of these inwardly bent terminal ends 30 there is fixed a sleeve 32 which forms a socket for the reception of the other inwardly bent end 30, thus releasably holding the inturned ends in alignment and substantially at the spacing of the gap 26. There is fastened to the loop 22 at the under side of the plane thereof a pair of downwardly diverging bails or sub-loops 34 and 36 of shallow U-shape arranged diametrically opposite each other and with the bail 36 situated adjacent to the handle and spanning the gap, the horizontal bottom members of the respective bails being designed to underlie and support the respective ears of the utensil. The bail 34 consists of spaced, downwardly projecting rigid legs 38 having integral with their lower ends and extending therebetween the horizontal run or bottom member 40 paralleling the plane of the loop. The bail 36 has corresponding downwardly projecting rigid legs 42 whose ends are rigidly joined to the annulus adjacent to the junctions of the respective handle elements 24 and 28 with the annulus, the lower ends of the legs being united to a horizontal run 44 paralleling the plane of the loop; this run, however, being divided substantially midway between the legs so that the bail 36 consists of two parts, one part being fastened to the loop at each side of the gap 26. The distance between the horizontal portions 40 and 44 of the bails is substantially less than the over-all distance between the opposite side edges of the lips 18 of the receptacle to which it is to be applied. Accordingly, in the application of the device to the receptacle, the bail 34 is first applied to underlie one lip 18 and then the handle is spread to the dotted line position shown in Fig. 1 to separate the horizontal parts 44 of the bail 36 sufficiently to straddle the other lip 18 and to permit passage of these ends down over the lateral edges of the lip and downwardly beneath the lip, whereupon they may be allowed to come together beneath the lip by releasing the handle parts and allowing the natural resilience of the loop 22 to draw them together.

It is apparent that by the aforesaid construction no gripping action is required on the parallel parts 28—28 of the handle to hold the bails 34 and 36 in engagement with the lips 18; that endwise movement of the receptacle in the holder cannot disengage the bails from either lip so as to release the receptacle, that if gripping action is applied to the handle parts as, for example, by one who is overcautious, nervous or excited and seeks to grip the receptacle when it is not necessary, such gripping action will have no camming action on the receptacle of a kind to throw the receptacle out of the bails. Consequently the device will lend itself to safe transfer of heavy and hot articles from a stove or other heating device. Moreover since the plane of the loop 22 is situated above and out of contact with the rim or lip of the receptacle, there is no direct transfer of heat therefrom to the loop and hence to the handle portion. While there will be some heat conducted through the bails 34 and 36 to the main loop 22, this heat will be largely dissipated by reason of the thinness of the loop so that by the time it reaches the handle portion it will not be sufficient to make the latter uncomfortable.

It should be understood that the present disclosure is for the purpose of illustration only and that this invention includes all modifications and equivalents which fall within the scope of the appended claims.

I claim:

1. A device for lifting a cooking utensil of the kind which has diametrically opposite lifting ears projecting from a marginal rim, said device comprising a length of stiff resilient wire shaped to provide an annular loop having a gap at one point in its circumference, the wire being bent at each side of the gap to provide outwardly extending, substantially straight handle elements whose extremities are bent into alignment, means normally holding said extremities in alignment but permitting relative movement toward and from each other, the resilience of the wire being such as normally to maintain the annular loop at its minimum diameter with said extremities of the handle elements abutting, the annular loop and handle elements being in the same plane, a pair of ear-supporting bails, each of shallow U-shape, carried by the annular loop and extending downwardly from the latter, one of said bails bridging the gap in the annular loop and the other of said bails being located at a point diametrically opposite the gap, the first of said bails comprising parts which are separable by separation of the handle elements thereby to admit passage of the widthwise dimension of the lifting ear of the utensil between said separated parts of the bail in applying the lifting device to the utensil.

2. A device for holding a cooking utensil of the kind which has diametrically opposite, substantially horizontal lifting lips projecting from a rim, said device comprising a resilient wire annulus having a gap at one side and which has an inherent tendency to contract so as to diminish the width of the gap, the wire forming the annulus having bends defining the respective sides of the gap and extending outwardly from the respective bends to form substantially straight, parallel spaced handle elements, the end portions of the handle elements being directed toward each other and being in alignment, a sleeve fixed to one of said end portions and in which the opposite end portion loosely fits, the annulus and handle elements lying in substantially the same plane, a bail of shallow U-shape located at the diametrically opposite side of the annulus from the gap and having the upper ends of its legs rigidly joined to the annulus at opposite sides respectively of a diameter of the latter which bisects the gap, and a similar bail having the upper ends of its legs rigidly joined to the annulus approximately at the junctions of the respective handle elements with the annulus, the bottom member of the latter bail being substantially parallel to the plane of the annular loop and having a gap disposed symmetrically with respect to the aforesaid diameter of the annulus whereby the opposite side portions of said latter bail may be separated to admit the ear of the utensil to be introduced between the legs of the bail.

BUTLER AMES.

REFERENCES CITED

The following references are of record in the file of this patent:

UNITED STATES PATENTS

| Number | Name | Date |
|---|---|---|
| 71,336 | Smith | Nov. 26, 1867 |
| 656,547 | Hudson | Aug. 21, 1900 |
| 986,854 | Peck | Mar. 14, 1911 |
| 1,032,921 | Mathias | July 16, 1912 |
| 1,341,371 | Kilian | May 25, 1920 |
| 2,070,367 | Mackilbank | Feb. 9, 1937 |

FOREIGN PATENTS

| Number | Country | Date |
|---|---|---|
| 413,114 | Great Britain | July 12, 1934 |